(12) United States Patent
Birke et al.

(10) Patent No.: US 6,706,441 B1
(45) Date of Patent: Mar. 16, 2004

(54) PASTE-LIKE MASSES FOR ELECTROCHEMICAL COMPONENTS, LAYERS PRODUCED THEREFROM, AND ELECTROCHEMICAL COMPONENTS

(75) Inventors: Peter Birke, Itzehoe (DE); Gerold Neumann, Halstenbeck (DE)

(73) Assignee: Fraunhofer-Gesellschaft zur Forderung der Angewandten Forschung e.V. (DE)

( * ) Notice: Subject to any disclaimer, the term of this patent is extended or adjusted under 35 U.S.C. 154(b) by 0 days.

(21) Appl. No.: 09/786,595

(22) PCT Filed: Aug. 27, 1999

(86) PCT No.: PCT/EP99/06313

§ 371 (c)(1), (2), (4) Date: Apr. 13, 2001

(87) PCT Pub. No.: WO00/13249

PCT Pub. Date: Mar. 9, 2000

(30) Foreign Application Priority Data

Aug. 28, 1998 (DE) .......................... 198 39 217

(51) Int. Cl.⁷ .................. H01M 4/58; H01M 4/62; H01M 4/88; H01M 6/00

(52) U.S. Cl. .............. 429/218.1; 429/217; 429/232; 429/231.6; 429/231.95; 252/182.1; 29/623.1

(58) Field of Search ................ 429/217, 232, 429/218.1, 223, 231.6, 231.95; 252/182.1; 29/623.1

(56) References Cited

U.S. PATENT DOCUMENTS

| 5,009,970 A | * | 4/1991 | Kronfli et al. | 429/317 |
|---|---|---|---|---|
| 5,041,346 A | * | 8/1991 | Giles | 429/309 |
| 5,296,318 A | * | 3/1994 | Gozdz et al. | 429/316 |
| 5,338,625 A | * | 8/1994 | Bates et al. | 429/322 |

(List continued on next page.)

FOREIGN PATENT DOCUMENTS

| DE | 3939316 | * | 3/1991 |
|---|---|---|---|
| EP | 0379372 | * | 7/1990 |
| EP | 0528557 | * | 2/1993 |
| EP | 0557250 | * | 8/1993 |
| EP | 0762525 | * | 3/1997 |
| EP | 11031414 | * | 2/1999 |
| JP | 06-150973 | * | 5/1994 |
| JP | 10-270023 | * | 9/1998 |
| WO | 95/16285 | * | 6/1995 |
| WO | 96/38868 | * | 12/1996 |
| WO | 97/06573 | * | 2/1997 |
| WO | 97/49106 | * | 12/1997 |
| WO | 98/18173 | * | 4/1998 |
| WO | 98/26468 | * | 6/1998 |
| WO | 99/44245 | * | 9/1999 |

OTHER PUBLICATIONS

Feuillade, G., Ion–conductive macromolecular gels and membranes for solid lithium cells, Journal of Applied Electrochemistry 5 (1975) pp. 63–69.*

Primary Examiner—Patrick Ryan
Assistant Examiner—Thomas H. Parsons
(74) Attorney, Agent, or Firm—R W Becker & Associates; R W Becker

(57) ABSTRACT

The invention relates to a paste-like mass that can be used in electrochemical elements comprising a matrix comprising at least one organic polymer, precursors thereof, or prepolymers thereof, and an electrochemically activatable inorganic material that is not soluble in the matrix and that is in the form of a solid substance, whereby either (a) the mass comprises at least 60 vol. % (B) and, if (B) is an electrode material, (B) is worked into the matrix (A) without the assistance of a solvent or swelling agent or the matrix (A) also contains a plasticizer for the organic polymer, and the plasticizer is subsequently removed using a suitable solvent, (C) and/or (c) the mixture also contains a solid ion electron and/or mixed conductor that is different from (B) and that is present at least at the grain limits between (A) and (B) as a thin layer.

35 Claims, 5 Drawing Sheets

U.S. PATENT DOCUMENTS

| | | | |
|---|---|---|---|
| 5,418,091 A | * 5/1995 | Gozdz et al. | 429/252 |
| 5,429,891 A | * 7/1995 | Gozdz et al. | 429/316 |
| 5,456,000 A | * 10/1995 | Gozdz et al. | 29/623.2 |
| 5,460,904 A | * 10/1995 | Gozdz et al. | 429/316 |
| 5,470,357 A | * 11/1995 | Schmutz et al. | 29/623.5 |
| 5,478,668 A | * 12/1995 | Gozdz et al. | 429/127 |
| 5,540,741 A | * 7/1996 | Gozdz et al. | 29/623.5 |
| 5,546,000 A | * 8/1996 | Maas et al. | 324/322 |
| 5,571,634 A | * 11/1996 | Gozdz et al. | 429/309 |
| 5,587,253 A | * 12/1996 | Gozdz et al. | 429/316 |
| 5,607,485 A | * 3/1997 | Gozdz et al. | 29/623.5 |
| 5,648,011 A | * 7/1997 | Blonsky | 252/62.2 |
| 5,707,759 A | * 1/1998 | Simon et al. | 429/217 |
| 5,738,691 A | * 4/1998 | Barker et al. | 29/623.1 |
| 6,001,509 A | * 12/1999 | Kim et al. | 429/309 |

* cited by examiner

PASTE-LIKE MASSES FOR ELECTROCHEMICAL COMPONENTS, LAYERS PRODUCED THEREFROM, AND ELECTROCHEMICAL COMPONENTS

BACKGROUND OF THE INVENTION

The present invention relates to novel materials with electrochemical properties, in particular paste-like masses, layers produced from these paste-like masses that are self-supporting or that are placed on a substrate, and composite layers produced therefrom that can be used as accumulators, electrochromic elements, or the like. The invention particularly relates to rechargeable electrochemical cells on a fixed body base.

Since the beginning of the 1970's there have been attempts to produce electrochemical elements such as accumulators or the like in the form of thin layers. The goal has been to obtain composite films that are both flexible enough that they can be, for instance, rolled up or made to conform to another desired shape and that also have particularly good charging and discharging properties due to an extremely high contact area between the individual electrochemical components, such as electrodes and electrolytes, relative to the volume of active electrochemical material used.

In the past, attempts to produce such electrode materials have begun with solid or viscous liquid Teflon, which is mixed with a certain percentage of carbon and the actual electrode material and is then pressed or sprayed onto suitable reference electrodes. However, this results in layers that have insufficient flexibility. In addition, it has been suggested that electrode layers be produced that are manufactured with PVC and tetrahydrofurane or another polymer dissolved in a solvent and that the solvent subsequently be extracted therefrom. However, the conductivity of products produced in this manner is not favorable.

Producing a layer that can function in an appropriate electrochemical composite as an electrolyte presents particular problems. U.S. Pat. No. 5,456,000 describes rechargeable battery cells that are produced by laminating electrode and electrolyte cells. Used for the positive electrode is a film or membrane that is produced separately from $LiMn_2O_4$ powder in a matrix solution made of a copolymer and is then dried. The negative electrode comprises a dried coating of a pulverized carbon dispersion in a matrix solution of a copolymer. An electrolyte/separator membrane is arranged between the electrode layers. For this purpose a poly(vinylidene fluoride)-hexafluoropropylene copolymer is converted with an organic plasticizer such as propylene carbonate or ethylene carbonate. A film is produced from these components and then the plasticizer is extracted from the layer. The battery cell is maintained in this "inactive" condition until it is to be used. In order to activate it, it is immersed in a suitable electrolyte solution, whereby the cavities formed by extracting the plasticizer are filled with the liquid electrolytes. The battery is then ready for use.

Such a construct is disadvantageous in that the battery cannot be maintained for extended periods in a charged condition because corrosion occurs at the limit surfaces (see oral presentation made by A. Blyr et. al., 4th Euroconference on Solid State Ionics, Connemara, Ireland, September 1997, provided for publication). The use of a liquid electrolyte thus entails stability problems at the phase limits in the composite layer. Another disadvantage is that the battery must be arranged in a housing that is leak-proof.

There have already been attempts to use solid electrolytes. It has been suggested that ion-conducting organic polymer materials be used (so-called true polymer electrolytes). Thus, U.S. Pat. No. 5,009,970 describes using a gel product that is obtained by converting a solid poly(ethylene oxide) polymer with lithium perchlorate and then irradiating it. U.S. Pat. No. 5,041,346 describes an oxymethylene cross-linked variant of these polymer electrolytes that also contains a softener that preferably has ion-solvating properties, for example, that can be a dipolar aprotic solvent such as g-butyrolactone. However, it has been reported that although the ion conductivity compared to pure solid lithium is drastically elevated, it is still not sufficient for use as an electrolyte layer in electrochemical elements.

Another attempt to use solid electrolytes has involved similar polymer electrolytes. In this case polyvinylfluoride polymers and related fluorocarbon copolymers were used with trifluoroethylene or tetrafluoroethylene. Added to these polymers were lithium salts and additional organic solvents that were compatible both with the polymers and with the salt components (Tsuchida et. al., Elektrochimica Acta, Volume 28 (1983, page 591 ff and page 833 ff). However, in this case a usable ion conductivity of greater than about $10^{-5}$S/cm can only be obtained at elevated temperatures because, as the authors themselves reported, this mixture did not remain homogeneous; rather, it formed salt and polymer crystallite. Research in this direction was therefore later deemed unpromising (see U.S. Pat. No. 5,456,000, column 2, lines 31 through 33).

The object of the present invention is to provide masses for producing electrochemical elements in the form of thin composite layers that do not have the aforesaid unfavorable properties. In particular the inventive masses, when processed into layers or composite layers with electrochemical properties, should provide products such as rechargeable batteries (accumulators), electrochromic elements, or the like, that have a high degree of flexibility and very good electron- and ion-conducting properties and that furthermore cannot leak and therefore do not have to be maintained in housings, especially in sealing housings.

SUMMARY OF THE INVENTION

This object is achieved in that, in accordance with the invention, paste-like masses that can be used in electronic elements are prepared that include a heterogeneous mixture of (A) a matrix containing or comprising at least one organic polymer, precursors thereof, or prepolymers thereof, and (B) an inorganic material that can be electrochemically activated, is not soluble in the matrix, and is in the form of a solid substance. The mixture contains no lithiated zeolites, nor any electron or ion conducting organic polymers.

The term "that can be used in electrochemical elements" implies that the electrochemically activatable inorganic material that is in the form of a solid substance must be an ion-conducting or electron-conducting material that is suitable for electrode material or for a solid electrolyte.

In accordance with the invention at least one additional condition must be satisfied so that there is sufficient electrical contact between the individual grains of the electrochemically activatable solid substance (B) that is embedded in the matrix (A). Namely, it has been demonstrated that the poor conductivity described in the prior art cannot be overcome unless the mass contains a sufficient quantity of electrochemically activatable solid substance. Very good conductivity, or even sufficient conductivity, cannot be achieved unless the proportional volume of the electrochemically activatable solid substance is so high that it is approximately equal to the filled space in a theoretical close-pack. The minimum can vary somewhat depending on the materials used, since naturally parameters such as size and external shape of the electrochemically activatable solid substance (B) obviously play a role. However, it is recommended that at least 60 volume % of solid substance (B) be used, preferably a minimum of about 65 volume %, and particularly preferably a minimum of about 70 volume %. The upper limit is not critical; it depends primarily on the properties of the matrix (A). If it [the matrix] has very good adhesion, it is possible to work into the paste-like mass up to 90 volume %, in exceptional cases even up to 95 volume %, of solid substance (B).

However, alternatively or in addition, it is also possible to achieve sufficient electrical contact between the grains of the solid substance (B) in that a second ion- and/or electron-conductor (or a homogeneous, mixed conductor, depending on the type of conductivity needed) (C) is used that is present as a thin layer, at least at the grain limits between (A) and (B).

Additional conditions variant (a) or (b), must be met if the solid substance (B) is an electrode material.

BRIEF DESCRIPTION OF THE DRAWINGS

The invention is also explained in greater detail with respect to the drawings, in which.

DESCRIPTION OF PREFERRED EMBODIMENTS

Figure 4A:
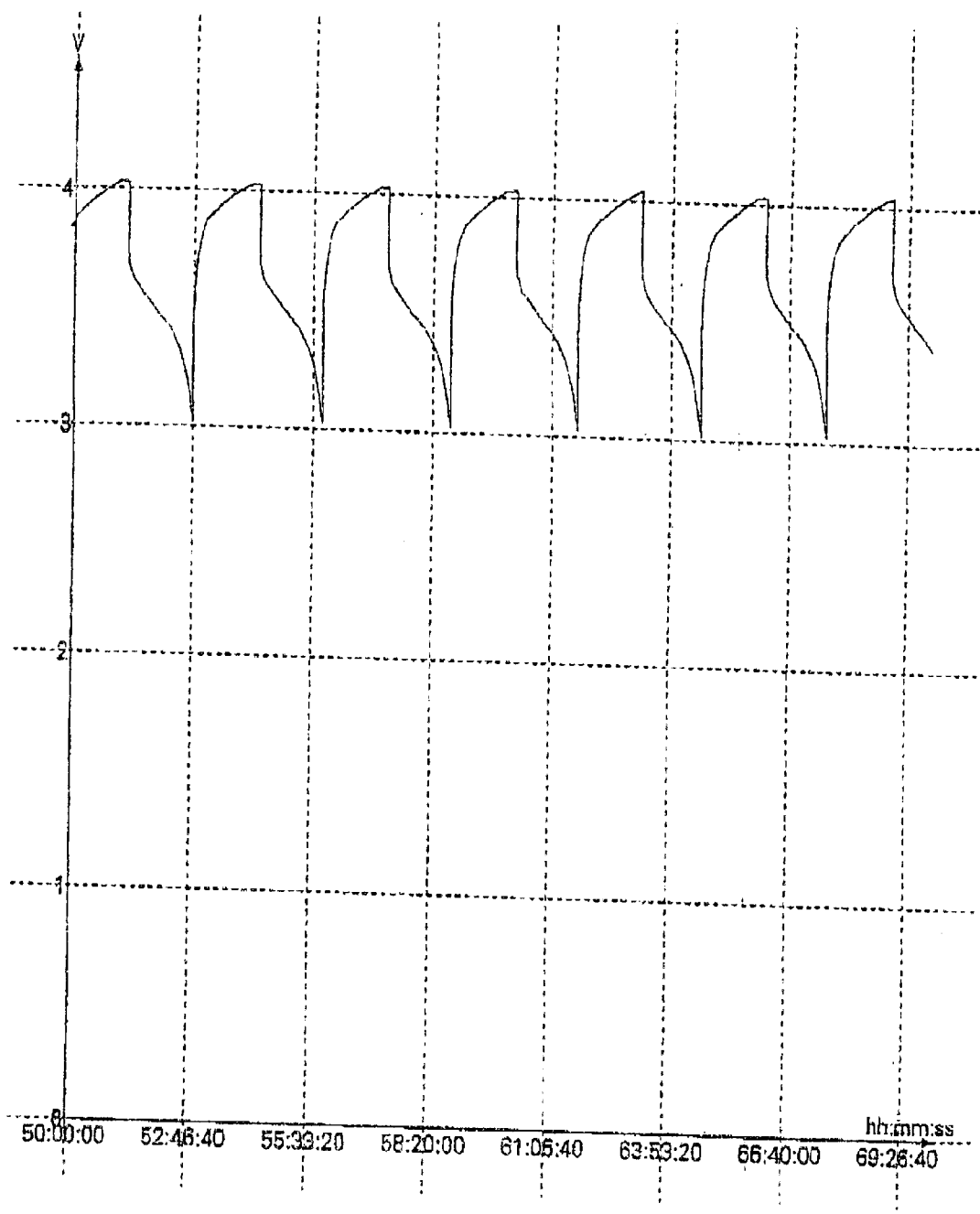
Figure 4B:
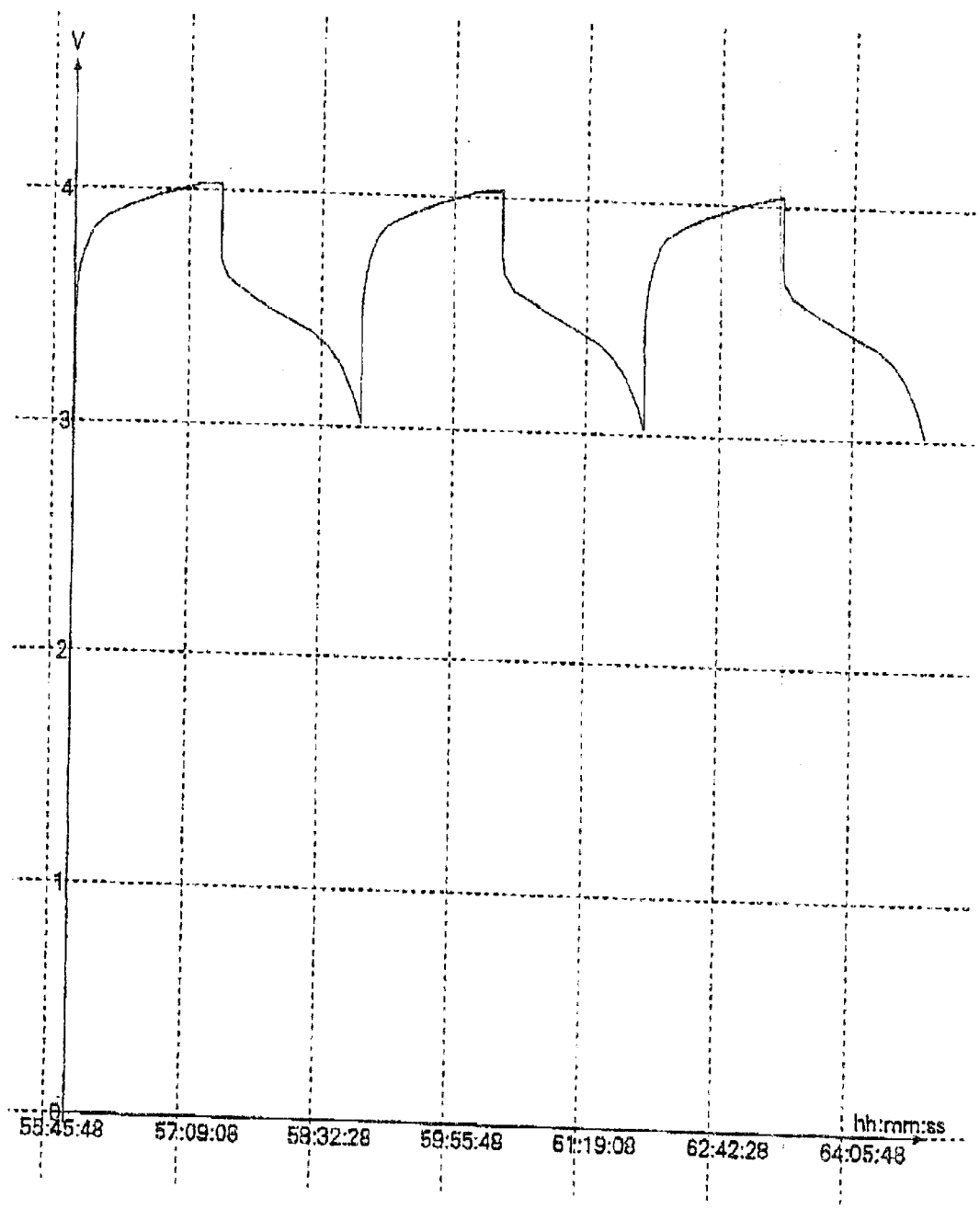

Surprisingly it could be determined that, due to the measures, upon which the invention is based, it is possible to substantially reduce the irreversible losses that necessarily occur during charging and discharging. Charging and discharging are symmetrical and reproducible, as can be seen in FIGS. 4a and 4b.

The mass obtains its paste-like consistency by using a suitable matrix (A). The term "paste-like" means that the mass, once it has been produced, can be processed-using current paste application methods, for example, it can be applied to a base using a brush, spatula, rake, or various pressure methods. Depending on the need, the mass can be made to be relatively thin to very viscous.

A plurality of materials can be used for the matrix (A). Systems containing solvents or solvent-free systems can be used. Solvent-free systems that are suitable are, for example, cross-linkable liquid or paste-like resin systems. Examples are resins made of cross-linkable addition polymers or condensation resins. For instance, pre-condensates of phenoplasts (novolak) or aminoplasts can be used that are final-polymerized to the layer of an electrochemical composite layer after the paste-like mass has been formed. Additional examples are unsaturated polyesters, such as polyester that can be cross-linked to styrene by graft copolymerization, polycarbonates that can be cross-linked by bifunctional epoxy resins that are bifunctional reaction partner curable (for example bisphenol A epoxy resin, cold cured with polyamide), polyisocyanurate that can be cross-linked by a polyol, and binary polymethyl methacrylate, which can also be polymerized with styrene. The paste-like mass is formed from the more or less viscous precondensate or non-cross-linked polymer for matrix (A) or using essential components thereof, together with the component (B).

Another option is to use polymers or polymer precursors together with a solvent or swelling agent for the organic polymer if the solid substance (B) is not an electrode material. In principle there is no limit in terms of the synthetic or natural polymers that can be used. Not only can polymers with carbon main chains be used, but also polymers with heteroions in the main chain, such as polyamides, polyesters, proteins, or polysaccharides. The polymers can be homopolymers or copolymers. The copolymers can be statistical copolymers, graft copolymers, block copolymers, or polyblends—there is no limitation. In terms of polymers with a pure carbon main chain, natural or synthetic rubbers can be used, for instance. Particularly preferred are fluorinated hydrocarbon polymers such as Teflon, poly(vinylidene fluoride) (on PVDF) or polyvinyl chloride, since these make it possible to obtain particularly good water-repellant properties in the films or layers formed from the paste-like mass. This imparts particularly good long-term stability to the electrochemical elements thus produced. Additional examples are polystyrene or polyurethane. Examples of copolymers are copolymers of Teflon, amorphous fluoropolymers, and poly(vinylidene fluoride)/hexafluoropropylene (commercially available as Kynarflex). Examples of polymers with heteroatoms in the main chain are polyamides of the diamine dicarboxylic acid type or of the amino acid type, polycarbonates, polyacetals, polyethers, and acrylics. Additional materials include natural and synthetic polysaccharides (homeoglycans and heteroglycans), proteoglycans, for example, starch, cellulose, methylcellulose. In addition, substances such as chondroitin sulfate, hyaluronic acid, chitin, natural or synthetic wax, and many other substances can be used. In addition, the aforesaid resins (precondensates) can be used in solvents and diluents.

One skilled in the art is familiar with solvents and swelling agents for the aforesaid polymers.

A plasticizer (also softener) can be present for the polymer or polymers used regardless of whether or not the matrix (A) contains a solvent or swelling agent. "Plasticizer" or "softener" should be understood to include substances whose molecules are bonded to the plastic molecules by coordinate bonds (Van der Waals forces). They thus diminish the interacting forces between the macromolecules and therefore lower the softening temperature and the brittleness and hardness of the plastics. This is different from swelling agents and solvents. Due to their higher volatility, it is generally also not possible to remove them by evaporating them out of the plastic. Rather, they must be extracted using an appropriate solvent. Using a plasticizer effects high mechanical flexibility in the layer that can be produced from the paste-like mass.

One skilled in the art is familiar with suitable softeners for each of the plastics groups. They must be highly compatible with the plastic into which they are to be worked. Common softeners are high-boiling esters of phthalic acid or phosphoric acid, such as dibutyl phthalate or dioctyphthalate. Also suitable are, for instance, ethylene carbonate, propylene carbonate, dimethoxyethane, dimethylcarbonate, diethyl carbonate, butyrolactone, ethylmethylsulfon, poly-ethylene glycol, tetraglyme, 1,3-dioxolane, or S,S-Dialkyldithiocarbonate.

If a combination of plastic and plasticizer is used for the matrix, the plasticizer can then be extracted (or should be extracted, if only the features of claim variation 1b are used) from the paste-like mass using an appropriate solvent. The cavities that now occur are closed during the subsequent conversion of the mass into an electrochemically active or activatable layer by pressure or laminating processes for combining the various layers. This improves the electrochemical stability of the charged accumulator. When solid electrolytes are used in the described plastic matrix it is desirable to achieve ionic conductivity of at least $10^{-4}$ S cm$^{-1}$.

Instead of later compressing the cavities, they can also be filled with a second solid electrolyte or electrode material once the plasticizer has been extracted.

As stated in the foregoing, these inventive paste-like masses and layers produced therefrom are suitable for a plurality of electrochemical elements. One skilled in the art can select the same solid substances (B) that he would use for classic electrochemical elements, that is, substances to which no plastics have been added.

The following solid substances are examples of options that can be used for lithium-technology accumulators:

| | |
|---|---|
| lower contact electrodes | Al, Cu, Pt, Au, C |
| positive electrode | LiF, Li$_2$NiVO$_4$, Li$_x$[Mn]$_2$O$_4$, LiCoO$_2$, LiNiO$_2$, LiNi$_{0.5}$Co$_{0.5}$O$_2$, LiNi$_{0.8}$Co$_{0.2}$O$_2$, V$_2$O$_5$, Li$_x$V$_6$O$_{13}$ |
| electrolyte (solid body, in this case) | Li$_{1.3}$Al$_{0.3}$Ti$_{1.7}$(PO$_4$)$_3$, LiTaO$_3$SrTiO$_3$, LiTi$_2$(PO$_4$)$_3$LiO$_2$, LiH$_2$(PO$_4$)$_3$Li$_2$O, Li$_4$SiO$_4$Li$_3$PO$_4$, LiX + ROH where X = Cl, Br, I (1, 2 or 4 ROH per LiX) |
| negative electrode | Li, L$_{4+x}$Ti$_5$O$_{12}$, Li$_x$MoO$_2$, Li$_x$WO$_2$, Li$_x$C$_{12}$, Li$_x$C$_6$, lithium alloys |
| upper contact electrodes | Al, Cu, Mo, W, Ti, V, Cr, Ni |

However, of course, the present invention is not limited to lithium-technology accumulators, but rather, as stated in the foregoing, includes all systems that can be produced using "conventional" technology, that is, without working in an organic polymer matrix.

The following describes a few special embodiments of the paste-like masses that are suitable for special elements or element parts. For those electrochemically activatable parts that are not prior art, it should be clear that these substances can also be used in "bulk form", i.e., without the polymer matrix, in appropriate electrochemical elements.

Appropriately selecting the electrochemically active substances makes it possible to produce electrochemical elements, such as accumulators, whose characteristics in the charge/discharge curves make it possible to control the charge/discharge status of the accumulator. Thus mixtures of two of the electrode materials cited in the forgoing, or of other appropriate electrode materials, can be used for the electrochemically activatable solid substance (B) for the positive or negative electrodes, the mixtures having different oxidation and reduction stages. Alternatively one of the two substances can be replaced with carbon. This leads to characteristic segments in the charge/discharge curves that make it possible to advantageously detect the charge or discharge status of an accumulator produced using such masses. The curves have two different plateaus. If the plateau that is near the discharge status is achieved, this status can be indicated to the user so that he knows that he will soon need to recharge, and vice versa.

If carbon and an element that can be alloyed with lithium is worked into a paste-like mass provided for a negative electrode, this imparts to the electrode that can be produced therefrom (with properties of an alloy electrode or intercalation electrode) a particularly high capacity that has improved electrochemical stability. In addition, the expansion in volume is lower than in a pure intercalation electrode.

Furthermore, graphite or amorphous carbon (carbon black) or a mixture of the two can be worked into the paste-like mass with electrode material for a positive or negative electrode. Particularly advantageous in this regard are weight proportions of 20 to 80% by weight amorphous carbon relative to the electrochemically activatable components. If the mass is provided for a positive electrode, the lubricating effect of the carbon is an advantageous property that improves the mechanical flexibility of a layer produced from the paste-like mass. If the mass is provided for a negative electrode, the electrochemical stability and electronic conductivity is improved, as has been described in the foregoing.

The inventive paste-like mass can also be used for other electrodes as intercalation electrodes. One example of this is the use of metal powder combined with an alkali or earth alkali salt as the electrochemically activatable solid substance (B). A paste-like mass produced with this combination can be used to produce decomposition electrodes. The expansion in volume that is typical for intercalation electrodes does not occur in this case, which leads to improved service life overtime. An example of this is combining copper and lithium sulfate.

A very particular electrode variant can be obtained when the electrode material (B) is a metal that does not react with lithium and that contains a lithium salt. The matrix (A) in this variant is produced as described in the foregoing from a combination of plastic with a plasticizer that is later extracted from the paste-like mass. In this variant, however, the cavities that then occur are not subsequently closed under pressure during lamination of the electrochemically activatable layers. On the contrary, care is taken that they remain open. When combined with a lithium salt in the adjacent electrolyte layer, an electrode thus comprised has the property of being able to reversibly introduce and spread lithium in the cavities that occur. It has the advantages of an intercalation electrode, but avoids the disadvantages of such an electrode (for example, expansion in volume) and has excellent electrical properties due to the large interior surface. An example of a metal that does not react with lithium is nickel.

Surprisingly it has also been demonstrated that working a phase mixture comprising Li$_4$SiO$_4$·Li$_3$PO$_4$ into the inventive paste-like mass, regardless of intended electrochemical application, leads to an improvement in the plasticity of the electrodes or solid electrolyte produced therefrom. This requires that the phase mixture be ground extremely fine. The extremely small grain sizes must be the reason for improved internal sliding effect.

Regardless of whether the solid substance (B) is an electrode material or an electrolyte material, it can comprise one lithium ion conductor and one or more additional ion conductors (Li, Cu, Ag, Mg, F, Cl, H). Electrodes and electrolyte layers made of these substances have particularly favorable electrochemical properties such as capacity, energy density, and mechanical and electrochemical stability.

In accordance with the present invention, if the paste-like mass of the present invention is additionally to contain a second solid ion, electron, and/or mixed conductor (C), it can be worked into the matrix in different ways. If it is an ion conductor that is soluble in a solvent (such as the solvent in which the matrix material (A) is also soluble), the paste-like mass can be produced in that the solvent for the matrix material contains this second ion conductor. The vapor pressure of the solvent must be low enough that it can be extracted or can evaporate in a subsequent stage (for example after the components of the mass are thoroughly mixed, if the mass also has a paste-like consistency absent the solvent, or after producing the layer or film). When in such an embodiment of the invention a plasticizer is also present, it is possible to select a plasticizer that is also soluble in the solvent and that subsequently can also be removed using said solvent. This embodiment of the invention can also be produced with conductors (C) that have relatively poor conductivity (especially ion conductivity, if the intent is to have this property).

In a further embodiment of the invention an ion, electron, or mixed conductor (C) is selected that is soluble in the plasticizer that is selected for the system. In this case, the plasticizer should have a relatively low vapor pressure. When component (C) dissolved in plasticizer is thoroughly mixed with the other components of the paste-like mass this produces a modified grain limit between the conducting components, the limit having a certain plasticity. In this embodiment of the invention, the conductivity of the electrochemically activatable solid substance (B) may clearly not be as high as that of an electrochemically activatable solid substance (B) that constitutes the sole electrochemically relevant component of the mixture. In this variant, quaternary lithium ion conductors, such as $Li_4SiO_4 \cdot Li_3PO_4$, $Li_4SiO_4 \cdot Li_2SO_4$, or $Li_4SiO_4 \cdot Li_5AlO_4$, can be used for component (B) that combine ionic conductivity on the order of magnitude of $10^{-6}$ S/cm with high stability. The plasticity of the grain limits can be caused to increase if, in addition, a substance with high vapor pressure (for example ether or dimethoxethane for plasticizer and dibutyl phthalate) is worked into the paste-like mass. In this case the solvent acts as a modifying agent for the plasticizer. Such an embodiment is possible, for example, if the matrix contains or essentially comprises PVC or PVDF or other halogenated hydrocarbon polymers.

It is possible to use a hygroscopic salt if the conductor (C) is an ion conductor. In this embodiment of the invention, the ion conductor (C) is worked into the paste-like mass in an anhydrous or lower water form. Water is absorbed during processing (or by subsequent storage in a humid environment). This results in a grain limit for this ion conductor that has a certain plasticity. If the hygroscopic ion conductor is able to form crystalline hydrates, the deposit of the diffusing water as crystallized water in a fixed grain size can causes cause an expansion in volume that creates improved grain limit contact, and the weaker bond of the conducting ion to the surrounding hydrate envelope also improves the ionic conductivity of the electrolyte (the cation of the electrolytes can move in its polar envelope to a certain degree). An example of a salt that can be used in this manner is $LiNO_3$.

If a salt that is insensitive to hydrolysis is used for conductor (C), for example a lithium salt selected from among perchlorate, the halogenides (X=Cl, Br, I), nitrate, sulfate, borate, carbonate, hydroxide, or tetrafluoroborate, especially for producing a solid electrolyte, the inventive paste-like mass and the electrochemically activatable layer to be produced therefrom can be produced in an advantageous manner in an ambient atmosphere.

The components described in the foregoing from which the inventive paste-like mass is produced can be mixed in a conventional manner, preferably by vigorously agitating or kneading the components. If necessary the organic polymer or its precursors are pre-dissolved or pre-swollen in the solvent or swelling agent before the component (B) is added. In a particularly preferred embodiment of the invention, the mass is subjected to ultrasonic treatment during the mixing process or thereafter. This causes the solid substance (B) and the conductor (C), if any, to pack more densely because the grains break up and thus decrease in size. This improves the electrical and electrochemical properties of the paste-like mass. The materials provided for the electrodes or electrolytes can also be subjected to such an ultrasonic treatment prior to being worked into the mass in order to reduce the size of the grains at the beginning of the process.

Embedding the solid substances (B) in the matrix (A) means that the powder of the electrochemically activatable substances does not have to be sintered at high temperatures, as is customary for "conventional" electrochemical elements. Such sintering would not result in the initial substances having a paste-like consistency.

The inventive paste-like masses are especially suitable for producing thin-film batteries and other similar electrochemical elements such as electrochromic elements. Preferably these are elements in so-called "thick-film" technology. The individual layers of these elements are also called "tapes". Individual electrochemically active or activatable layers are produced in thicknesses from approximately 10 μm to approximately 1 to 2 mm, placed upon one another, and brought into intimate contact. One skilled in the art will select the thickness appropriate for the application.

Ranges are preferably from approximately 50 μm to 500 μm; especially preferred is a range of approximately 100 μm. However, in accordance with the invention it is also possible to produce corresponding thin-film elements (this term includes thicknesses of preferably 100 nm to a few μm). However, this application may be limited because corresponding elements will not satisfy current requirements in terms of capacity in a number of cases. However, it is conceivable that the application could be used for back-up chips, for instance.

The present invention therefore furthermore includes layers that can be produced from the paste-like masses described in the foregoing that are self-supporting or that are placed on a substrate, preferably in the thicknesses indicated. The layers are preferably flexible.

For producing both the self-supporting layers (films, tapes) [and] layers that can be placed on a substrate, methods known in prior art can be used that can be used for the appropriate polymer materials of the matrix. The consolidation of the paste-like masses then occurs, depending on the material, by curing (of resins or other precondensates), by cross-linking prepolymerisates or linear polymerisates, by evaporating solvents, or in a similar manner. In order to obtain self-supporting films, a suitable paste-like mass can be formed in the appropriate thickness on calenders, for examples. Standard technology can be used for this. Self-supporting layers can also be formed by applying the paste-like mass to a substrate and removing the layer produced after it has consolidated. The requirement for this is that the product has sufficient flexibility. The coating process can be performed using conventional paste application methods. For instance, application can be performed by brush, rake, spraying, spin coating, etc. Pressure techniques can also be used.

In a preferred embodiment of the invention, cross-linkable resin masses (pre-condensates) are used as described above for the paste-like masses, and are cured by UV or electron radiation once the layer has been formed. Curing can naturally also be thermal or chemical (for example by immersing the produced layer in an appropriate bath). If necessary, suitable initiators or accelerators or the like are added to the masses for the cross-linking.

The present invention furthermore relates to composite layers with electrochemical properties, especially accumulators and other batteries or electrochromic elements that are formed by or include a corresponding sequence of the aforesaid layers.

Figure 1:
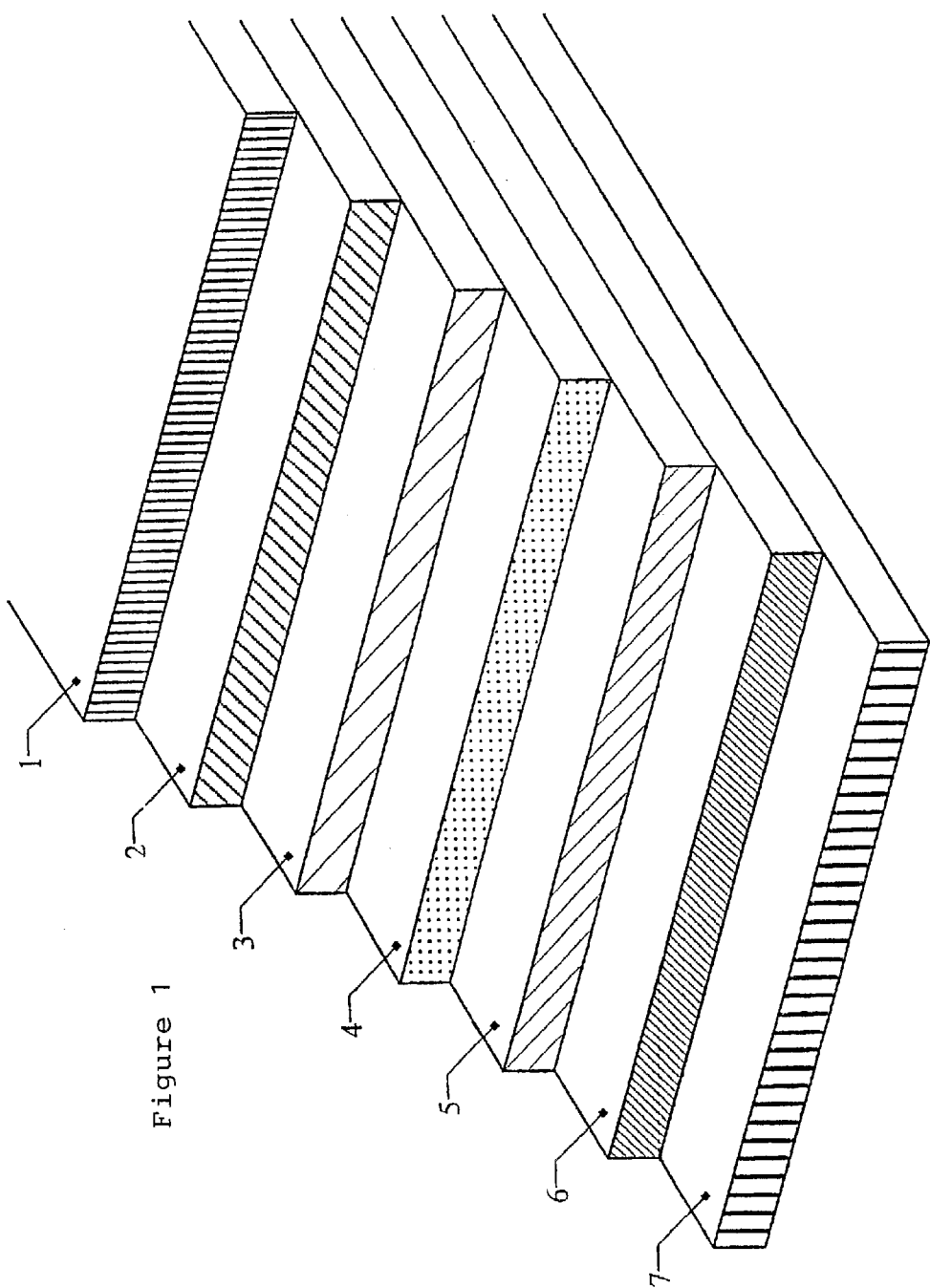
FIG. 1 illustrates the sequence of an inventive composite layer with electrochemical properties.

FIG. 1 illustrates the sequence of such an arrangement. The labels are: contact electrode 1, intermediate tape 2, electrode 3, electrolyte 4, electrode 5, intermediate tape 6, and contact electrode 7. The following text provides a more detailed explanation.

For producing composite layers, the individual paste-like masses can be applied ply by ply upon one another by means of paste application methods. Either each individual ply can be cross-linked by itself or it can be released by solvent or made into layer form in some other manner. However, it is also possible to consolidate the individual matrices by cross-linking or evaporating the solvent or swelling agent or the like once all of the required layers have been applied. This latter is advantageous, for instance, if the individual electrochemically activatable layers are applied using a pressure method that occurs analogous to polychromy. An example of this is the Flexodruck technique, by means of which multiple meters/second of a substrate can be printed continuously with the required electrochemically activatable layers.

Alternatively, every layer or film can be converted individually into its final consolidated state. If these are self-supporting films, the appropriate components of the element to be formed can then be joined together by lamination. Conventional laminating techniques can be used for this. These include, for example, extrusion coating, whereby the second layer is bonded to a carrier layer by pressure rollers, calender coating with two or three roll nips, wherein the substrate web runs in in addition to the paste-like mass, or doubling (bonding under pressure and counterpressure of preferably heated rollers). One skilled in the art will not have any problem finding the techniques that are appropriate depending on the selection of the matrices for the paste-like masses.

A pressure process during the bonding (lamination) of the individual layers can frequently be desirable, not only for improved bonding (and therefore for achieving improved conductivity) in the individual layers, but also, for instance, in order to eliminate any cavities that are present in the individual layers that were produced, for instance, when the plasticizer is washed out, etc., as described in the foregoing. Current techniques can be used for this. Cold pressing (at temperatures below 60° C.) can be advantageous if the materials used permit this. This provides particularly good contact among the individual layers.

The electrochemical parts that can be produced with the inventive paste-like masses are not limited. It is therefore understood that the embodiments described in the following are merely examples and preferred embodiments.

Re-chargeable electrochemical cells can be produced in thick-layer technology in this manner, i.e., with individual electrochemically activatable layers in a thickness of approximately 10 $\mu$m to approximately 1 to 2 mm and preferably approximately 100 $\mu$m. If the electrochemical cell is to be based on lithium technology, the solid substances for the electrodes or electrolyte layers can be those substances that have already been enumerated in the foregoing for this purpose. At least three layers should be provided, namely, one that functions as a positive electrode, one that functions as a solid body electrolyte, and one that functions as the negative electrode, i.e., layers 3, 4, and 5 in FIG. 1.

In accordance with the invention it has been demonstrated that particularly advantageous current densities can be obtained in the accumulator if certain limits are observed. As is known, current density can be adjusted by the resistance of the electrolyte. If it is too high, polarization can destroy the electrodes over the long term. If it is too low, the power of the produced accumulator is only sufficient for a few applications. The aforesaid limit is preferably 1 mA/cm$^2$. For instance, if the conductivity of an electrolyte is 10$^{-4}$ S/cm, it is particularly advantageous for the electrolyte layer to be approximately 100 $\mu$m thick. A current density of 1 mA/cm$^2$ then causes a drop in voltage, caused by the resistance, that is a negligible 0.1 V. In contrast, if the conductivity of the electrolytes is 10$^{-5}$ S/cm, for instance, the thickness of the electrolyte layer can be reduced to about 10 $\mu$m. It is therefore recommended that the layer thickness d be selected relative to conductivity $\sigma_{ion}$ and an ionic resistance ($\Omega$) and relative to the surface A such that the following formula is satisfied:

$$200\Omega < d/(\sigma_{ion} \cdot A)$$

The aforesaid three-layer cell (or any other desired electrochemical element, comprising positive electrode/electrolyte/negative electrode) can additionally be provided with reference (layers 1 and 7 in FIG. 1). It is useful that these comprise films of suitable materials (materials for reference electrodes that can be used in lithium technology are described earlier in this specification).

Figure 3:
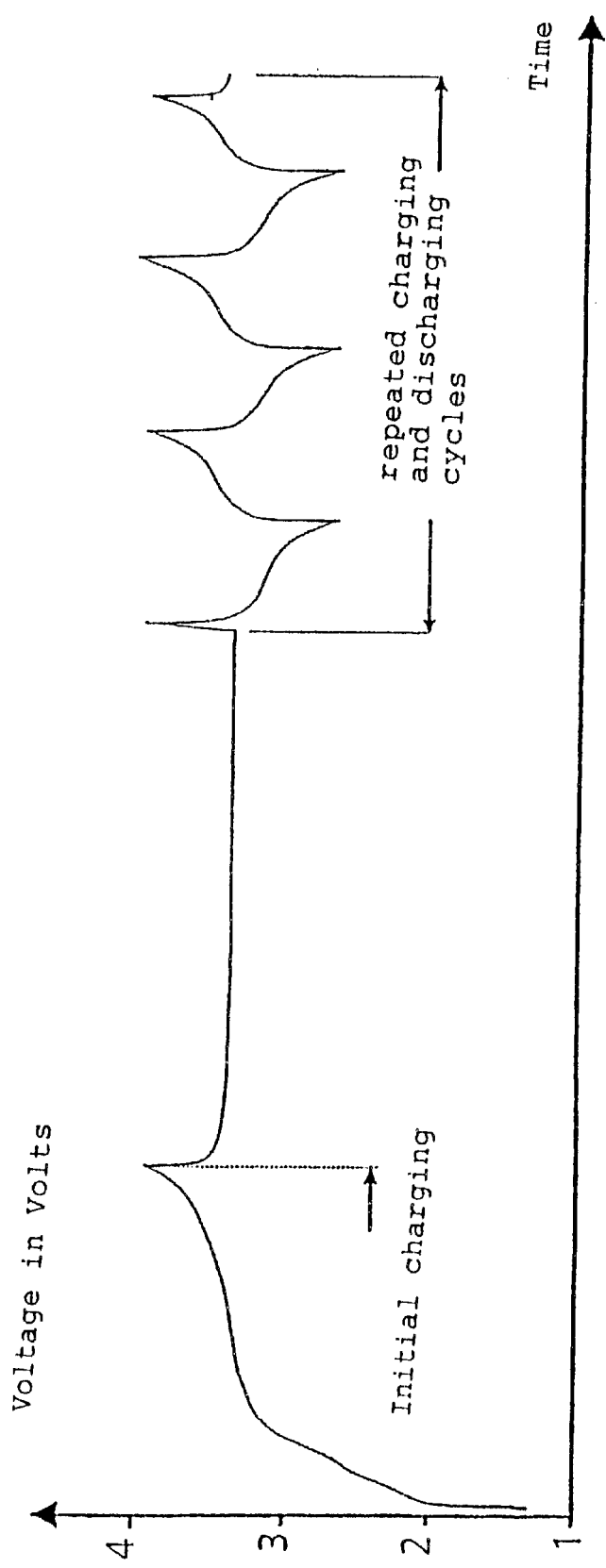
FIG. 3 illustrates charge and discharge curves for an inventive embodiment using lithium technology with the layers in the sequence illustrated in FIG. 1; and, FIGS. 4a and 4b (the latter with cycles excerpted and enlarged) illustrate charge and discharge curves (voltage/time) of accumulators in accordance with the invention (negative electrode: graphite; positive electrode: lithium cobalt oxide).

In a special embodiment of the invention, worked in between the lower reference electrode and the adjacent electrode and between the upper reference electrode and the adjacent electrode is an additional thin plastic layer ("intermediate tape", layers 2 and 6 in FIG. 1) thatcan also be produced using a paste-like mass of the present invention. This thin plastic layer should contain conducting metal elements or alloys of such elements that are suitable for transporting electrons from the electrode material to the reference electrode. Examples of this are the elements gold, platinum, rhodium, and carbon, or alloys of these elements, if the plastic layer is to be arranged between the positive electrode and the associated reference electrode. If it is to be arranged between the negative electrode and the reference electrode, the elements that are appropriate are nickel, iron, chromium, titanium, molybdenum, tungsten, vanadium, manganese, niobium, tantalum, cobalt, and carbon. The information provided in the foregoing about the electrodes and electrolytes also applies, of course, to the concentration and structure of the paste-like masses from which these layers are formed. An embodiment with reference electrodes and intermediate tapes (see also FIG. 1) has charge and discharge curves as illustrated in FIG. 3 if it is produced, for example using the aforesaid lithium technology.

The electrochemical elements of the present invention can be sealed, for example in a plastic-based housing. The weight in this case is advantageously less than that of metal housings. There are also advantages in terms of energy density.

The electrochemical composite layer (the electrochemical element) can also be embedded between two or more films made of a plastic coated with wax or paraffin. These materials act as a seal and, due to their inherent properties, can also exert mechanical pressure on the composite layer, thereby advantageously achieving improved contact in the composite layer due to the pressure.

While the electrochemical element is sealed as described in the foregoing or in some other manner, the interior can be subjected to a pre- determined water/oxygen partial pressure that effects high electrochemical stability. This can be done, for instance, by sealing the electrochemical element in such an environment with parameters that have been selected and adjusted appropriately.

If, as can be the case with many embodiments, moisture penetrates into the composite film during the course of the production process, which can have long-term undesirable consequences, the composite can be inserted in a housing or the like under a vacuum prior to sealing and, if necessary, can be subjected to an elevated temperature in order to extract the moisture.

In a special embodiment of the invention, a three-layer system as described in the foregoing is selected for a rechargeable accumulator, whereby the layers receive an additive that decomposes during charging. The decomposition products form new connections at the limit surfaces with the electrochemically activatable components (B) or (C) that are present there, whereby a five-layer system actually occurs if these decomposition products are ion conductors. One example of this is the addition of ether, which forms lithium organyls at the limit surfaces of an accumulator using lithium technology. In addition, polymer components of the matrix, plasticizer, viscosity agent, and/or residual water that has penetrated during processing can be thus decomposed or partially decomposed in appropriate embodiments.

In another embodiment of the present invention, a layer is selected for the electrolyte layer that comprises two films of differing composition that are laminated to one another, each of which have been adapted to the electrode with which it is in contact. This has a positive effect on the stability of the phase limits between positive electrode and electrolyte 1 and between negative electrode and electrolyte 2. A concrete example of this embodiment is using lithium iodide for the electrolyte material in the first layer and $Li_{1.3}Al_{0.3}Ti_{1.7}(PO_4)_3$ for the electrolyte material in the second layer.

An example of a galvanic cell with electrochromic properties would be a series of layers comprising the following sequence:

Conductor 1/Y/MeX-alcoholate/$WO_3$/Conductor 2

In this sequence the metal Me can be selected from among, for example, lithium, sodium, potassium, rubidium, or cesium, and its anion X from among, for example, the halogenides chloride, bromide, and iodide. Conductor 1 can be selected from, for example, indium tin oxide (ITO), zinc aluminum oxide ($Zn_xAl_yO_z$) and silver. Conductor 2 can be selected from among, for example, indium tin oxide (ITO) and zinc aluminum oxide ($Zn_xAl_yO_z$).

Figure 2:
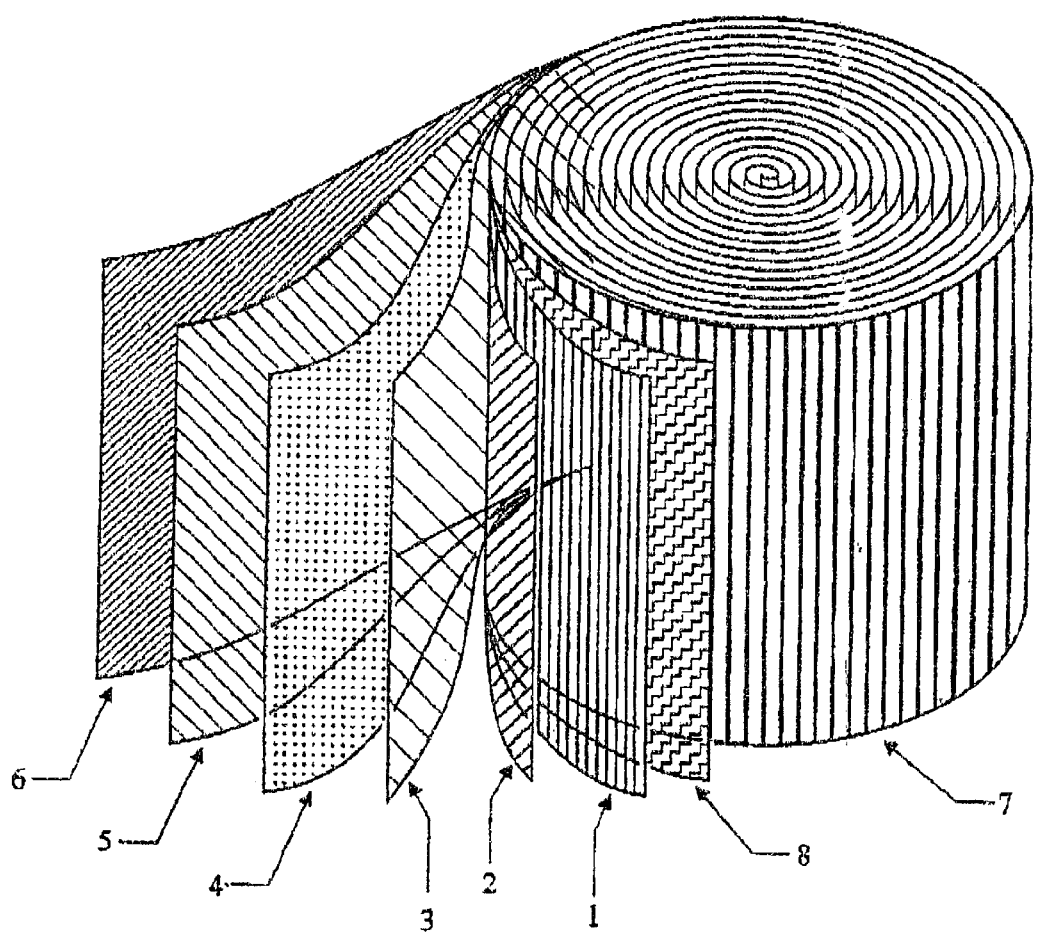
FIG. 2 illustrates a composite layer in accordance with FIG. 1 that has been rolled up.

The inventive series of layers forth electrochemical elements can be arranged in any desired shape. For instance, the flexible composite layer can be rolled up, which achieves particularly advantageous geometry for compact accumulators. If the accumulator has a small volume, this provides a very large active battery surface. FIG. 2 illustrates such an embodiment, whereby reference numbers 1 through 7 indicate the same items as in FIG. 1 and reference number 8 indicates an insulating layer.

Non-self-supporting composite layers can also be applied to solid bases like walls for integrated energy storage (self-supporting composite films can of course also be applied or affixed thereto). In this case it is possible to take advantage of large surface areas. The accumulators themselves are not associated with a space requirement. A special example of an embodiment of this type is the integration of composite layers for accumulators in substrates for solar cells. Independent energy supply units can be created in this manner. Layer sequences for accumulators can also be applied to solid or flexible substrates in order to work in electronic structures of the integrated energy storage.

The concrete examples in the following provide a more detailed explanation of the invention.

EXAMPLE 1

For producing a positive electrode, 0.8 g PVC are combined with 1.2 g dibutyl phthalate and 8 g acetone. 3 to 6 g $LiMn_2O_4$ and 0.5 to 0.75 g C are added as fine powder, whereupon the components are thoroughly mixed by vigorous agitation. Then the paste-like mass obtained is applied to a substrate and dried.

EXAMPLE 2

An electrolyte layer is produced in that 0.8 to 1 g PVDF-HFP, 1.2 to 1.5 g dibutyl phthalate, and 14 g acetone are mixed thoroughly. 2.5 to 4 g $Li_gAlSiO_8$ and 0.35 to 0.5 g LiI are added as fine powder, whereupon the components are thoroughly mixed by vigorous agitation. Further processing occurs as described in example 1.

EXAMPLE 3

For producing a negative electrode, 1 g polystyrene is combined with 1.5 to 1.8 g dioctylphthalate and 15 g acetone. After a while 5 g graphite are added, and the mixture is stirred vigorously for a time to mix thoroughly. Further processing occurs as described in Example 1.

EXAMPLE 4

As for example 1, but 0.3 g ethylene carbonate are used instead of 1.2 g dibutyl phthalate. This example can also be embodied with a quantity of up to 0.6 g ethylene carbonate.

EXAMPLE 5

As for example 2, but 0.4 g ethylene carbonate and 0.05 to 0.2 g LiI are used instead of dibutyl phthalate.

EXAMPLE 6

As for example 3, but 0.5 g ethylene carbonate are used instead of dioctylphthalate.

EXAMPLE 7

For producing an anode, 1.5 g PVDF-HFP are combined with 0.6 g ethylene carbonate and 40 g acetone. 6 g graphite are added as a fine powder, whereupon the components are thoroughly mixed by vigorous agitation. Then the paste-like mass obtained is applied to a substrate and dried. Acetone and ethylene carbonate can be subsequently removed using current methods or, for example, preferably at 60 to 90° C. in a vacuum drying cabinet (approx. $10^{-2}$ mbar).

EXAMPLE 8

As for example 7, but up to 2.8 g acetylene black are also added to the mixture.

EXAMPLE 9

An electrolyte layer is produced in that 12 g PVDF-HFP, 3.6 g ethylene carbonate, and 90 g acetone are thoroughly mixed. 36 g $LiAlSiO_4$ (spodumene) are added in the form of fine powder, whereupon the mixture is thoroughly mixed by vigorous agitation. Further processing occurs as described in Example 1.

EXAMPLE 10

For producing a cathode, 2 g PVDF-HFP are combined with 0.8 g ethylene carbonate and 40 g acetone. After a while 8 g $LiCoO_2$ and 1.2 g acetylene black are added, and the mixture is thoroughly mixed for a period by vigorous agitation. Further processing occurs as described in Example 1.

Examples 11–13

The foil materials in preceding examples 1 through 3 can also be produced omitting solvents and softeners, whereby the components are mixed at suitable temperatures. The mass that is paste-like in the heat is then processed into the form of film using current hot-drawing and pressure methods.

The specification incorporates by reference the disclosure of German priority documents 198 39 217.6 of 28 August 1998 and PCT/EP99/06313 of 27 Aug. 1999.

The present invention is, of course, in no way restricted to the specific disclosure of the specification and drawings, but also encompasses any modifications within the scope of the appended claims.

What is claimed is:

1. A paste-like mass that can be used in electrochemical elements, comprising a heterogeneous mixture of:
   (A) a matrix comprising at least one organic polymer, precursors thereof, or prepolymers thereof, and
   (B) an electrochemically activatable inorganic material that is not soluble in said matrix and that is in the form of a solid substance, wherein at least one of the following applies:
      a) said mixture comprises at least approximately 60 vol. % (B) and, if (B) is an electrode material, (B) is worked into said matrix (A) without the assistance of a solvent or swelling agent for said organic polymer, its precursors, or its prepolymers,
      b) said mixture comprises at least approximately 60 vol. % (B) and, if (B) is an electrode material, can be produced in that (B) is worked into a matrix (A) that also contains a plasticizer for said organic polymer, wherein said plasticizer is subsequently removed using a suitable solvent, and
      c) said mixture also contains:
   (C) at least one of a solid ion and mixed conductor that is different from (B) and that is present as a thin layer at least at the grain limits between (A) and (B).

2. A paste-like mass according to claim 1, wherein (a) or (c) applies, and wherein said matrix (A) also contains a plasticizer.

3. A paste-like mass according to claim 2, wherein said ion conductor (C) is soluble in said plasticizer for said matrix (A).

4. A paste-like mass according to claim 1, wherein (a) or (c) applies, and wherein said matrix (A) furthermore contains a solvent or swelling agent for said organic polymer, its precursors, or its prepolymers.

5. A paste-like mass according to claim 4, wherein said conductor (C) is soluble in said solvent or swelling agent.

6. A paste-like mass according to claim 1, wherein said conductor (C) is selected from among compounds that are hygroscopic and that can bind moisture drawn in as crystal water, or is selected from among one or more lithium salts that are insensitive to hydrolysis.

7. A paste-like mass according to claim 1, wherein said matrix (A) is or contains a cross-linkable, liquid or soft resin.

8. A paste-like mass according to claim 7, wherein said resin is selected from among cross-linkable addition polymers and condensation resins, especially aminoplasts, phenoplasts, epoxy resins, polyesters, polycarbamates, and methyl methacrylate reaction resins.

9. A paste-like mass according to claim 1, wherein said organic polymer of said matrix (A) is selected from among natural polymers and synthetic polymers and mixtures thereof, especially natural and synthetic polysaccharides, proteins, resins, waxes, and halogenated and non-halogenated rubbers, thermoplasts, and thermoelastomers.

10. A paste-like mass according to claim 1, wherein said matrix (A) comprises at least one organic polymer that is at least partially dissolved or swollen in a solvent or swelling agent, and wherein said organic polymer is selected from among synthetic polymers, natural polymers and mixtures thereof.

11. A paste-like mass according to claim 1, wherein said electrochemically activatable material (B) is selected from the group consisting of substances that are suitable for positive electrode material, that are suitable as negative electrode material, that are suitable as solid body electrolytes, that are suitable as electrochemically active electrode materials, and that are suitable as ionic or electronic intermediate conductors between two such substances or materials that are arranged adjacent to one another in an electrochemical element.

12. A paste-like mass according to claim 1, wherein (B) is an electrode material, and wherein said mixture also contains (D) at least one of carbon black and graphite, preferably in a proportion by weight of 20–80% relative to said solid substance (B).

13. A paste-like mass according to claim 1, wherein (B) is an electrode material, and wherein said mixture also contains (D) an alkali salt or earth alkali salt.

14. A paste-like mass according to claim 1, wherein (B) is a metal powder combined with an alkali salt or earth alkali salt.

15. A paste-like mass according to claim 1, wherein (B) is a metal that does not react with lithium and (D) furthermore contains a lithium salt.

16. A paste-like mass according to claim 1, wherein said mixture contains no lithiated zeolites, nor any electron or ion conducting organic polymers.

17. A method for producing a paste-like mass according to claim 1, wherein said organic polymer, its precursors, or its prepolymers are combined and thoroughly mixed with a solvent or swelling agent for said polymer, its precursors, or its prepolymers and with said electrochemically activatable material (B), provided said material is not an electrode material.

18. A method according to claim 17, wherein said paste-like mass obtained is subjected to ultrasound treatment.

19. A method for producing a paste-like mass according to claim 1, wherein a cross-linkable prepolymerisate is combined and thoroughly mixed with an electrochemically activatable material (B).

20. A method according to claim 19, wherein said paste-like mass obtained is subjected to ultrasound treatment.

21. A method for producing a paste-like mass according to claim 1, wherein said organic polymer, its precursors, or its prepolymers are combined and thoroughly mixed, with a plasticizer and an electrochemically activatable material (B), a solvent is subsequently added in which said plasticizer largely dissolves, and then said plasticizer dissolved in said solvent is washed out of said mass and any solvent is removed from said mass.

22. A method according to claim 21, wherein said paste-like mass obtained is subjected to ultrasound treatment.

23. A paste-like mass according to claim 1, wherein said mixture comprises at least approximately 60 vol. % (B) and (B) is an electrode material that is worked into a matrix (A) that also contains a plasticizer for said organic polymer and said plasticizer is subsequently removed using a suitable solvent in a manner such that cavities remain and the paste-like mass is substantially free of such cavities as a result of being subjected to a pressure process following the formation of such cavities.

24. A self-supporting layer or layer that is placed on a substrate, comprising a heterogeneous mixture of:
   (A) a matrix comprising at least one organic polymer, precursors thereof, or prepolymers thereof, and
   (B) an electrochemically activatable inorganic material that is not soluble in said matrix and that is in the form of a solid substance, wherein at least one of the following applies:
      a) said mixture comprises at least approximately 60 vol. % (B) and, if (B) is an electrode material, (B) is worked into said matrix (A) without the assistance of a solvent or swelling agent for said organic polymer, its precursors, or its prepolymers, b) said mixture comprises at least approximately 60 vol. % (B) and, if (B) is an electrode material, can be produced in that (B) is worked into a matrix (A) that also contains a plasticizer for said organic polymer, wherein said plasticizer is subsequently removed using a suitable solvent, and
      c) said mixture also contains:
   (C) at least one of a solid ion and mixed conductor that is different from (B) and that is present as a thin layer at least at the grain limits between (A) and (B).

25. A self-supporting layer or layer that is placed on a substrate according to claim 24, wherein said layer is a flexible layer.

26. A self-supporting layer or layer that is placed on a substrate according to claim 24, wherein said electrochemically activatable material is a solid electrolyte and the layer has a thickness (d) that satisfies the following formula: $200\Omega < d/(O_{ion} \cdot A)$, wherein $\Omega$ is ionic resistance, $O_{ion}$ is conductivity, and A is the surface area.

27. A self-supporting layer or layer that is placed on a substrate according to claim 24, wherein said layer contains no lithiated zeolites, nor any electron or ion conducting organic polymers.

28. A composite layer having electrochemical properties, comprising at least one of:
   (1) a layer according to claim 24, wherein said electrochemically activatable inorganic material (B) is selected from among substances that are suitable as materials for positive electrodes,
   (2) a layer according to claim 24, wherein said electrochemically activatable inorganic material (B) is selected from among substances having solid body electrolyte properties, and
   (3) a layer according to claim 24, wherein said electrochemically activatable inorganic material (B) is selected from among substances that are suitable as materials for negative electrodes.

29. A composite layer according to claims 28, wherein also applied to the layer with positive electrode material is a layer acting as a lower contact electrode, and to the layer with negative electrode material is a layer acting as an upper contact electrode.

30. A composite layer according to claim 29, wherein also present between said layer acting as a lower contact electrode and said layer with positive electrode material, and/or between said layer acting as an upper contact electrode and said layer with negative electrode material, is a thin layer of polymeric material that contains conductive metal elements, or alloys of these elements, that are suitable for transporting electrons from said electrode material to said contact electrode.

31. A rechargeable electrochemical cell in thick layertechnology, comprising a composite layer having electrochemical properties according to claim 28.

32. A rechargeable electrochemical cell according to claim 31, wherein said composite layer comprises tightly rolled layers.

33. A method for producing a composite layer according to claim 28, wherein each paste-like mass provided for a layer is applied to a substrate using a paste application method, particularly preferably using a pressure method, and said layers are then brought into their final consolidated state.

34. A method for producing a self-supporting layer or a layer placed on a substrate according to claim 24, wherein used for said paste-like mass is a mass whose matrix (A) comprises cross-linkable polymers or prepolymers and said layer produced from said paste-like mass is then subjected to cross-linking of the polymer components, which is effected photochemically, by electron radiation, or by heating or immersing said layer in a chemical cross-linking agent.

35. A method for manufacturing a self-supporting layer or layer placed on a substrate according to claim 34, wherein said matrix (A) comprises a resin and said formed layer is cured using UV or electron radiation.

* * * * *

UNITED STATES PATENT AND TRADEMARK OFFICE
CERTIFICATE OF CORRECTION

PATENT NO. : 6,706,441 B1
DATED : March 16, 2004
INVENTOR(S) : Birke et al.

It is certified that error appears in the above-identified patent and that said Letters Patent is hereby corrected as shown below:

Title page,
Item [54], Title should read as follows:
-- [54] PASTE-LIKE MASSES FOR ELECTROCHEMICAL ELEMENTS AND LAYERS AND ELECTROCHEMICAL ELEMENTS PRODUCED THEREFROM --

Signed and Sealed this

Twenty-second Day of June, 2004

JON W. DUDAS
*Acting Director of the United States Patent and Trademark Office*